United States Patent
De Picciotto

(10) Patent No.: US 10,401,123 B2
(45) Date of Patent: Sep. 3, 2019

(54) METHOD AND SYSTEM FOR THE TERMINAL-PHASE GUIDING OF AN INTERCEPTOR MISSILE TOWARDS A MOBILE AERIAL TARGET

(71) Applicant: MBDA FRANCE, Le Plessis-Robinson (FR)

(72) Inventor: François De Picciotto, Paris (FR)

(73) Assignee: MBDA FRANCE (FR)

( * ) Notice: Subject to any disclaimer, the term of this patent is extended or adjusted under 35 U.S.C. 154(b) by 185 days.

(21) Appl. No.: 15/316,273

(22) PCT Filed: Jun. 3, 2015

(86) PCT No.: PCT/FR2015/000109
§ 371 (c)(1),
(2) Date: Dec. 5, 2016

(87) PCT Pub. No.: WO2015/189485
PCT Pub. Date: Dec. 17, 2015

(65) Prior Publication Data
US 2017/0146320 A1 May 25, 2017

(30) Foreign Application Priority Data

Jun. 13, 2014 (FR) .................................... 14 01343

(51) Int. Cl.
*F41G 7/22* (2006.01)
*G05D 1/12* (2006.01)
*F41G 7/00* (2006.01)

(52) U.S. Cl.
CPC ................ *F41G 7/22* (2013.01); *G05D 1/12* (2013.01)

(58) Field of Classification Search
CPC ............ F41G 7/22; F41G 7/2213; F41G 7/30; G05D 1/12; G05D 1/108
See application file for complete search history.

(56) References Cited

U.S. PATENT DOCUMENTS

| 4,494,202 A * | 1/1985 | Yueh | G05D 1/12 235/412 |
| 4,783,744 A * | 11/1988 | Yueh | F41G 7/30 235/412 |
| 4,791,573 A * | 12/1988 | Zemany | G05D 1/108 244/3.2 |

(Continued)

FOREIGN PATENT DOCUMENTS

WO WO2013111138 A1 8/2013

OTHER PUBLICATIONS

ISA/EP International Search Report dated Sep. 9, 2015 re PCT Application No. PCT/FR2015/000109, filed Jun. 3, 2015.

(Continued)

*Primary Examiner* — Bernarr E Gregory
(74) *Attorney, Agent, or Firm* — Patrick J. Daugherty; Daugherty & Del Zoppo Co., LPA

(57) ABSTRACT

The invention relates to a method and system for the terminal-phase guiding of an interceptor missile towards a mobile aerial target. According to the invention, measurements delivered by the terminal guiding sensor are used to deduce a set of components of the interceptor missile-target dynamic, by means of Bayesian estimation, and the future of this dynamic is digitally integrated on line.

8 Claims, 1 Drawing Sheet

(56) References Cited

U.S. PATENT DOCUMENTS

| | | | | |
|---|---|---|---|---|
| 5,429,322 A | * | 7/1995 | Waymeyer | F41G 7/22 244/3.15 |
| 5,637,826 A | * | 6/1997 | Bessacini | G05D 1/12 114/21.1 |
| 5,660,355 A | * | 8/1997 | Waymeyer | F41G 7/22 244/3.15 |
| 6,006,145 A | | 12/1999 | Bessacini | |
| 6,254,030 B1 | * | 7/2001 | Sloan, Jr. | G05D 1/12 244/3.21 |
| 6,845,938 B2 | * | 1/2005 | Muravez | F41G 7/2213 244/3.1 |
| 7,394,047 B1 | | 7/2008 | Pedersen | |
| 2004/0155142 A1 | | 8/2004 | Muravez | |

OTHER PUBLICATIONS

Y. Oshman et al, Using a Multiple-Model Adaptive Estimator in a Random Evasion Missile/Aircraft Encounter, Journal of Guidance Control and Dynamics, vol. 24, No. 6, 2001.

David Salmond, Tracking and guidance with intermittent obscuration and association uncertainty, International Conference on Information Fusion, 2013.

\* cited by examiner

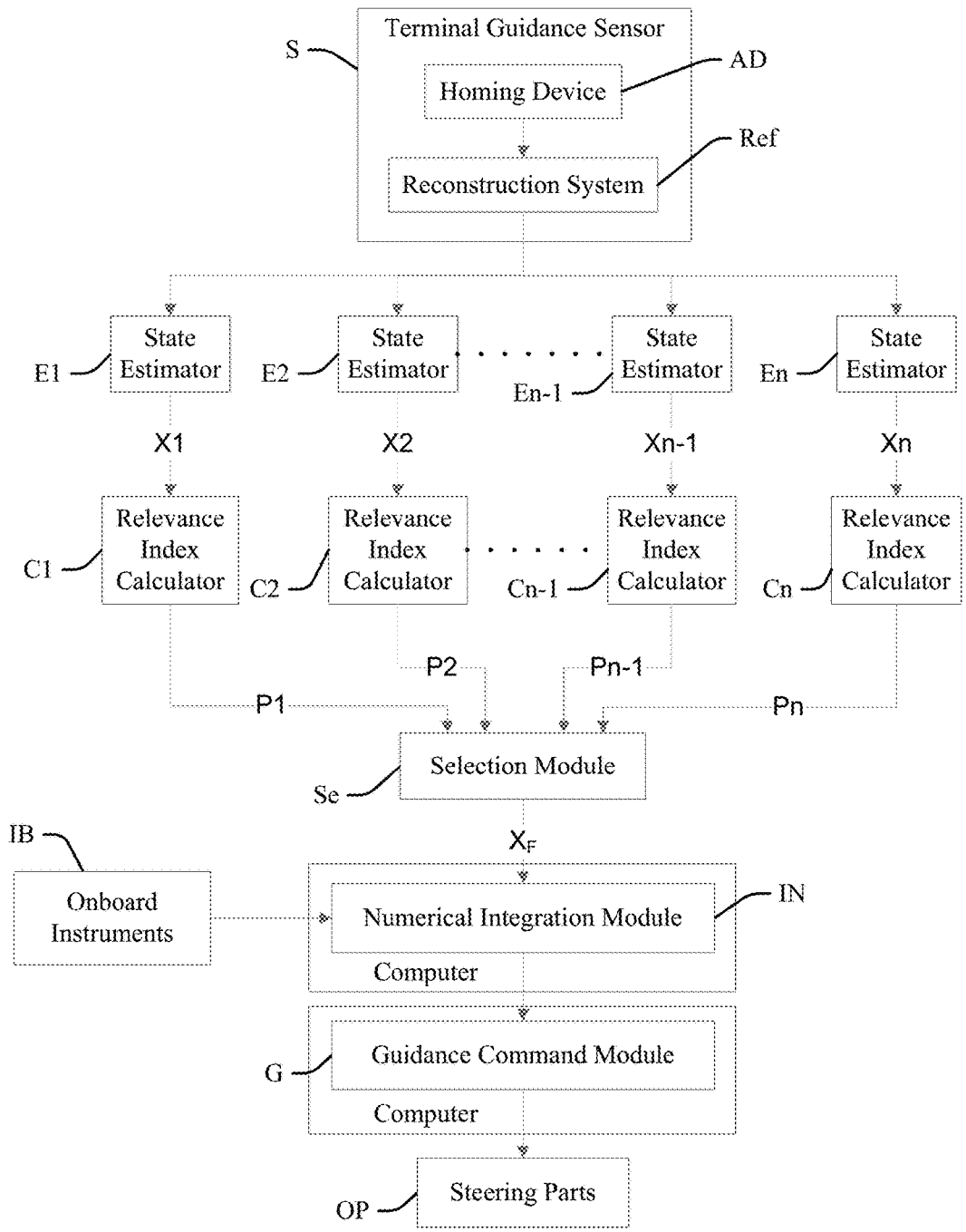

METHOD AND SYSTEM FOR THE TERMINAL-PHASE GUIDING OF AN INTERCEPTOR MISSILE TOWARDS A MOBILE AERIAL TARGET

BACKGROUND OF THE INVENTION

The present invention relates to a method and to a system for the terminal-phase guidance of an interceptor missile towards a moving aerial target.

It is known that the trajectory of an interceptor missile towards an aerial target includes several successive phases, in particular a launch phase, an intermediate phase and a terminal phase. While the guidance during the launch and intermediate phases are important for successful interception, the terminal-phase guidance is even more important since it is this guidance that determines the shortest distance for the interceptor missile to approach said target and thus the probability of the target being destroyed. In the technology for guiding the interceptor missiles, this shortest approach distance is generally referred to as the "closest point of approach".

In the prior art in general, an interceptor missile is guided in the terminal phase by "proportional navigation", i.e. proportionally to the apparent rotation of the straight line (sight line) linking the interceptor missile to said target. Guidance of this type is disadvantageous in that the acceleration of the interceptor missile and the acceleration of the target are assumed to be zero. Therefore, if this assumption does not prove to be true (which is often with case with highly manoeuvrable targets), the closest point of approach actually achieved cannot be the best one.

To overcome a drawback of this kind, this known technology can include specific variants that make it possible, for example, to:

compensate for a constant acceleration limit in the manoeuvring of either the interceptor missile or the target, compensate for a helical manoeuvre by the target, or compensate for the steering time constant of the interceptor missile.

In turn, specific variants of this kind are disadvantageous in that they are analytical and have to be calculated and saved beforehand in the guidance system of the interceptor missile.

In addition, each of these specific variants is only effective in the exact situation for which it has been developed, and cannot be directly combined with another to optimise the closest point of approach between an interceptor missile and a target that are in a situation resulting from the combination of the respective specific situations.

Therefore, the actual dynamic manoeuvring between the interceptor missile and the target generally cannot correspond to any of these variants or to combinations thereof.

Furthermore, the article "Decision Directed Adaptive Estimation and Guidance for an Interception Endgame" by Dany Dionne, Hannah Michaïska, Joseph Shinar and Yaakov Oshman in the "Journal of Guidance, Control and Dynamics", vol. 29, no. 4, July-August 2006 describes a terminal-phase guidance system in which the interceptor missile comprises a set of (Kalman filter-like) state estimators, a set of analytical guidance laws saved beforehand in said interceptor missile, and a decision unit for determining which of the predetermined guidance laws to implement on the basis of the measurements from said state estimator devices.

Therefore, this known guidance system includes the drawbacks mentioned above in relation to the specific variants for proportional navigation guidance.

In addition, this known guidance system also assumes that no external force is exerted on the interceptor missile, nor on the target until the point of interception Similarly, US 2004/155142 A1 uses a guidance law saved beforehand, the analytical expression of which is given by a plurality of equations.

The article "Using a multiple-model adaptive estimator in a random evasion missile/aircraft encounter" by Yaakov Oshman, Joseph Shinar and S. Avrashi Weizman in the "Journal of Guidance, Control and Dynamics", vol. 24, no. 6, November-December 2001 describes a DGL guidance law that implies no acceleration of the interceptor missile and no manoeuvring of the target.

BRIEF SUMMARY OF THE INVENTION

The object of the present invention is to overcome the aforementioned drawbacks of the prior art by making it possible to take account of relative, real, complex dynamic manoeuvring between the interceptor missile and the target (for the online determination of the optimum command to be implemented) in order to minimise said closest point of approach.

To this end, according to the invention, the method for the terminal-phase guidance of an interceptor missile towards an aerial target, said interceptor missile comprising:

onboard instruments capable of supplying information on the current dynamics of said interceptor missile;

parts for steering said interceptor missile;

a terminal-guidance sensor that supplies the deviation measurements of said target in a sequential manner;

a reconstruction system capable of reconstructing, from said deviation measurements and in a fixed frame of reference, at least the angle of elevation and bearing angle measurements that define the direction of said target in relation to said interceptor missile; and a plurality of state estimators Ei (where i=1, 2, . . . , n), each of which operates using a propagation function gi that corresponds to a particular hypothesis on the dynamics of said target, receives said deviation measurements and supplies, in a sequential manner, an estimate $X_i$ of the state of said target in accordance with the relationship $\dot{X}_i = g_i(X_i)$, where $\dot{X}_i$ is the derivative $dX_i/dt$ of said estimate $X_i$ in relation to time t, in which method:

for each state estimator Ei and in each step k of the sequential operation thereof, a relevance index is calculated, which is the probability $p_{ik}$ of the difference between the reconstructed angle of elevation and bearing angle measurements received from said reconstruction system and the corresponding angles of the predicted estimate $X_i$;

for each state estimator Ei, the cumulative product $Pi = \pi_k p_{ik}$ of the probabilities $p_{ik}$ from the first moment to the current time is calculated;

while taking account of the plurality of different cumulative probability products $P_i$, at least one final estimate $X_F$ of the state of said target is determined, as are the shortest distance for said interceptor missile to approach the target, the time remaining until this shortest approach distance, and the vector between the interceptor missile and the target at the time of said smallest approach distance;

a command for guiding said interceptor missile is created as a result, taking the vector into account; and said guidance command is applied to said parts for steering the interceptor missile, is characterised in that, in order to determine the shortest distance for the interceptor missile to approach the target, the time tgo remaining until this shortest approach distance and the vector $\overrightarrow{EBF}$ between the interceptor missile and the target at the time of said shortest approach distance, said final estimate $X_F$ is numerically integrated with the information on the dynamics of said interceptor missile by using the same propagation function(s) $g_F$ as that/those used by the corresponding state estimator(s) Ei.

BRIEF DESCRIPTION OF THE SEVERAL VIEWS OF THE DRAWING

FIG. 1 is a block diagram of a system according to the present invention.

DETAILED DESCRIPTION OF THE INVENTION

Thus, owing to the present invention, likely propagation models of the dynamics of the target are used to numerically predict the future of the complete interceptor missile-target dynamics up to the point of interception. The method according to the present invention allows both the interceptor missile-target dynamics to be estimated in a plural manner, not assumption by assumption, and this plural estimation to be used to predict the future of this dynamics.

Indeed, according to the present invention, the measurements supplied by the terminal-guidance sensor are used to derive therefrom, by Bayesian estimation, a set of components (phenomena) of the interceptor missile-target dynamics, and the future of said dynamics is numerically integrated online, from the present time up to the closest approach time, by using a numerical integration method, such as the Runge-Kutta method, while taking all the identified phenomena into account, thus making it possible to simultaneously predict the vector $\overrightarrow{EBF}$ of the expected closest point of approach with zero missile load, and the square of the time remaining before said time.

The method of the invention involves developing, onboard the interceptor missile, a numerical simulation that numerically integrates the future of the interceptor missile-target dynamics and is linked to a Bayesian estimation system which supplies this simulation, and then using this simulation for determining an optimum guidance command for the interceptor missile.

The command for guiding the interceptor missile can be in the following form:

$$\overrightarrow{\Gamma(t)} = \frac{N(tgo)}{tgo^2}\overrightarrow{EBF}$$

in which $\overrightarrow{\Gamma(t)}$ is the acceleration to be communicated to the interceptor missile as a function of time t and N(tgo) is a gain limit that may vary as a function of tgo.

Said final estimate $X_F$ can be formed simply by the estimate $X_i$ having the highest cumulative probability product Pi.

In a variant, this final estimate $X_F$ can be a combination of at least two estimates $X_i$ taking into account the respective cumulative probability products $P_i$.

The present invention also relates to a system for the terminal-phase guidance of an interceptor missile towards a moving aerial target, this system using the method described above.

The single FIG. 1 of the accompanying drawings will give a clear understanding as to how the invention can be implemented. This single FIGURE outlines the system according to the invention.

The block diagram shown by this single FIGURE shows a system for the terminal-phase guidance of an interceptor missile (not shown), which system is fitted onboard said missile and uses the method according to the present invention.

As is known, this guidance system comprises:

a terminal guidance sensor S comprising a homing device AD (IR seeker, RF seeker, visible seeker, etc.) and a system for changing frame of reference Ref. The homing device AD sequentially supplies the deviation measurements of the target (not shown) that it observes, these deviation measurements including at least two angles indicating the direction of the target in space in relation to the sight axis of the homing device AD. The purpose of the system Ref is to reconstruct the deviation measurements supplied by the homing device AD, in a fixed frame of reference, for example the local geographic frame of reference. The deviation measurements appearing at the output s of the terminal-phase guidance sensor S thus comprise at least one angle of elevation and a bearing angle that define the direction, in relation to the interceptor missile, of the target in said fixed frame of reference; and a plurality of state estimators E1, E2, . . . En−1, En, for example extended, unscented or other Kalman filters, particle filters, etc. Each state estimator Ei (where i=1, 2, . . . , n) corresponds to a particular hypothesis H1, H2, . . . Hn of the dynamics of the target and receives the deviation measurements from the terminal guidance sensor S. The measurement model, i.e. said particular hypothesis, associated with each state estimator Ei is the transformation that links the state variables of the target with the deviation measurements supplied by the terminal guidance sensor S. Each state estimator Ei operates using a respective propagation function g1, g2, . . . gn that corresponds to the associated hypothesis on the target dynamics, and supplies, in a sequential manner, an estimate X1, X2, . . . Xn (hereinafter Xi) of the state of said target in accordance with the relationship $\dot{X}=gi(Xi)$.

Example hypotheses Hi on the dynamics of the target, represented by the state estimators Ei, include:

a smooth ballistic movement, with no disturbances, resulting solely from drag and gravity;

a helical ballistic movement with oscillatory angle of attack, corresponding to the progressive redirection of the axis of the target causing a circular movement of increasing frequency and decreasing radius;

a double-helix ballistic movement with oscillating angle of attack, corresponding to the progressive redirection of the axis of the target with non-zero rolling thereof;

etc.

Respective relevance index calculators (calculation means) C1, C2, . . . Cn are associated with each state estimator Ei and receive the corresponding estimate Xi therefrom, each of said calculation means calculating, for each state estimator Ei and in each step k of the deviation measurement supplied by the terminal guidance sensor S:

both a relevance index that corresponds to the probability $p_{ik}$ of the innovation formed by the difference between the measurements, in the fixed frame of reference, of the angle of elevation and the bearing angle of the target in relation to the interceptor missile and the corresponding angles of the predicted estimate Xi. For all practical purposes, it should be noted in this case that within the Kalman theory, if vk is the innovation, $S^y_{k|k-1}$ is the upper Cholesky root of its predicted covariance, and $L_y$ is the size of the measurement, the probability of the innovation during the measurement k is as follows:

$$pinnov(v_k) = \frac{\exp(-\|v_k^T / S^y_{k|k-1}\|_2^2 / 2)}{(2\pi)^{Ly/2} |\prod_1^{L_y} S^y_{k|k-1}(i,i)|}$$

Naturally, the larger this probability, the more the received measurement conforms to the current model; and the cumulative product $P_i = \pi_k p_{ik}$ of the probabilities $p_{ik}$ from the first moment to the current time.

Thus the comparison of the different cumulative probability products $P_i$ makes it possible to determine the relevance of each estimate $X_i$ of the hypotheses Hi, and to arrange the hypotheses Hi according to the value of the cumulative product $P_i$ corresponding thereto.

To this end, the different cumulative probability products $P_i$ are sent to a selection module $S_e$, which arranges said hypotheses $H_i$ and forms from said estimates Xi at least one final estimate $X_F$, which it transmits to a numerical integration module IN, the algorithm of which is, for example, a Runge-Kutta algorithm.

This final estimation $X_F$ can simply be the estimate $X_i$ of the highest cumulative probability product Pi so as to only take the most likely corresponding hypothesis Hi into account.

However, the final estimation $X_F$ can be formed by a combination, for example the mean, of a plurality of estimates $X_i$, some of which may be weighted, while taking into account the respective cumulative probability products $P_i$.

In addition, in a variant, the selection module $S_e$ can transmit a plurality of estimates $X_i$, individually processed by the module IN, to said integration module IN.

The numerical integration module IN is therefore capable of propagating the dynamics of the target, represented by at least one final estimate $X_F$, preferably by using the same propagation function(s) $g_F$ as that/those used by the corresponding state estimator(s) $E_i$.

The integration module IN also receives information on the current dynamics of the interceptor missile from the onboard instruments IB thereof.

Therefore, the dynamics of the interceptor missile are shown by a state vector comprising at least six components, namely three position and three speed components, initialised at their currently known value. With regard, for example, to a return to zero steering load, other components, such as those of the steering time constant of the interceptor missile, may be integrated with said state vector.

The numerical integration carried out by the IN module thus makes it possible to predict the dynamics and the future relative situations between the interceptor missile and the target. With each time step of the numerical integration, the IN module calculates the relative position and the approach speed between the interceptor missile and the target. The module IN can thus predict the "closest point of approach" and the time tgo remaining until this shortest approach distance. Additionally, the module provides the vector $\overrightarrow{EBF}$ between the interceptor missile and the target at the exact moment of the shortest approach distance.

This information is transmitted to a guidance command module G which, for example, calculates a command in the following form:

$$\overrightarrow{\Gamma(t)} = \frac{N(tgo)}{tgo^2} \overrightarrow{EBF}$$

in which $\overrightarrow{\Gamma(t)}$ is the acceleration to be communicated to the interceptor missile as a function of time t and N(tgo) is a gain limit that may vary as a function of tgo and is generally between 3 and 4.

In the case described above where a plurality of estimates $X_i$ were transmitted, as $X_F$, to the integration module IN by the selection module $S_e$, the acceleration command is thus a combination or aggregation of the different respective accelerations resulting from one of said estimates $X_i$, taking into account the respective cumulative probability products $P_i$.

The guidance command created by the module G is applied thereby to the steering parts OP (control surfaces, jet nozzles, etc.) of the interceptor missile.

The invention claimed is:

1. A computer-implemented method for the terminal-phase guidance of an interceptor missile towards an aerial target, the method comprising executing on a processor the steps of:
    generating a plurality of deviation measurements for an aerial target in a sequential manner, wherein the deviation measurements comprise at least two angles indicating a direction of the target in space in relation to a sight axis of a homing device of an interceptor missile;
    reconstructing, from said deviation measurements and in a fixed frame of reference, at least an angle of elevation and a bearing angle measurement that define the direction of said target in relation to said interceptor missile;
    generating, via a plurality n of state estimators Ei (where i=1, 2, ... n) each executing a respective propagation function gi that corresponds to a particular hypothesis on dynamics of said target, from the deviation measurements, in a sequential manner, respective estimates Xi of a state of said target in accordance with a relationship ($\dot{X}i = dXi/dt = g_i(Xi)$);
    for each state estimator Ei, and in each step k of a sequential operation thereof, calculating a relevance index probability $p_{ik}$ of a difference between the reconstructed angle of elevation and bearing angle measurements and corresponding angles of respective ones of the estimates Xi;
    for each state estimator Ei, calculating a cumulative product $P_i = \pi_k p_{ik}$ of the relevance index probabilities $p_{ik}$ from a first moment to a current time;
    determining, as a function of the plurality of different cumulative probability products $P_i$, at least one final estimate $X_F$ of the state of said target, a closest approach distance for said interceptor missile to approach the target, a time remaining until the closest approach distance (tgo), and a vector between the interceptor missile and the target at a time of said closest approach distance ($\overrightarrow{EBF}$), wherein said at least one final estimate $X_F$ is numerically integrated with information on the dynamics of said interceptor missile by using same propagation functions $g_F$ as used by corresponding ones of the state estimators Ei;
    generating a guidance command for said interceptor missile as a function of the vector; and driving parts for steering said interceptor missile to execute said guidance command.

2. The method according to claim 1, wherein said command for guiding the interceptor missile is in the following form $(\vec{\Gamma(t)}=(N(t_{go})/t_{go}^2)*\vec{EBF})$;

wherein $\vec{\Gamma(t)}$ is an acceleration to be communicated to the interceptor missile as a function of time t, and $N(t_{go})$ is a gain limit that varies as a function of tgo.

3. The method according to claim 1, further comprising: generating the at least one final estimate $X_F$ is from a one of the estimates $X_i$ having a highest cumulative probability product $P_i$.

4. The method according to claim 1, further comprising: generating the at least one final estimate $X_F$ as a combination of at least two of the estimates $X_i$ as a function of their respective cumulative probability products $P_i$.

5. The method according to claim 1, further comprising: numerically integrating the at least one final estimate $X_F$ with information on current dynamics of the interceptor missile according to a Runge-Kutta method.

6. A system for the terminal-phase guidance of an interceptor missile towards an aerial target, comprising:
onboard instruments located upon an interceptor missile and configured to generate information on current dynamics of the interceptor missile;
parts for steering said interceptor missile;
a terminal-guidance sensor configured to supply deviation measurements of an aerial target in a sequential manner, wherein the deviation measurements comprise at least two angles indicating a direction of the target in space in relation to a sight axis of a homing device of the interceptor missile;
a reconstruction system configured to reconstruct, from said deviation measurements and in a fixed frame of reference, at least an angle of elevation and bearing angle measurements that define the direction of said target in relation to said interceptor missile;
a plurality n of state estimators Ei (where i=1, 2, ..., n), each of which operates using a propagation function gi that corresponds to a particular hypothesis on the dynamics of said target, receives said deviation measurements and provides, in a sequential manner, an estimate Xi of the state of said target in accordance with the relationship $(\dot{X}_i=dXi/dt=g_i(Xi))$;

a plurality of relevance index calculators that are each configured to calculate, for a one each of the state estimators Ei and in each step k of the sequential operation thereof, a relevance index probability $p_{ik}$ of a difference between the reconstructed angle of elevation and bearing angle measurements received from said reconstruction system and corresponding angles of the predicted estimate $X_i$, and to calculate for each state estimator Ei a cumulative product $P_i=\pi_k p_{ik}$ of the probabilities $p_{ik}$ from a first moment to a current time;
a selection module configured to create at least one final estimate $X_F$ of the state of said target as a function of the plurality of different cumulative probability products $P_i$;
a first computer comprising a numerical integration module configured to determine a closest distance for the interceptor missile to approach the target, a time remaining until this closest approach distance (tgo), and a vector between the interceptor missile and the target at the time of said closest approach distance ($\vec{EBF}$); and
a second computer comprising a guidance command module configured to create a guidance command for said interceptor missile;
wherein said numerical integration module determines the closest distance for the interceptor missile to approach the target, the time tgo remaining until this closest approach distance and the vector $\vec{EBF}$ between the interceptor missile and the target at the time of said closest approach distance by numerically integrating said final estimate $X_F$ with the information on the dynamics of said interceptor missile by using same propagation functions $g_F$ as that used by corresponding ones of the state estimators Ei.

7. The system according to claim 6, wherein said guidance command is in the following form: $(\vec{\Gamma(t)}=(N(t_{go})/t_{go}^2)*\vec{EBF})$;

wherein $\vec{\Gamma(t)}$ is an acceleration to be communicated to the interceptor missile as a function of time t, and N(tgo) is a gain limit that varies as a function of tgo.

8. The system according to claim 6, wherein the system is an interceptor missile.

* * * * *